Patented Aug. 8, 1944

2,355,058

UNITED STATES PATENT OFFICE 2,355,058

MANUFACTURE OF SET STABILIZED PLASTER

Dean D. Crandell, Buffalo, N. Y., assignor to National Gypsum Company, Buffalo, N. Y.

No Drawing. Application April 16, 1941, Serial No. 388,871

1 Claim. (Cl. 106—315)

The present invention relates to the manufacture of gypsum plaster the time of set of which has been stabilized against the influences of conditions encountered in the use of the plaster, which influences normally change the time of set of the plaster.

Certain acid sulfates, together with a retarder, have been suggested as an addition mix to calcined gypsum plaster in order to stabilize the set of the plaster against those influences which change the time of set of the plaster, such as hardness of water, amount and cleanliness of sand, and calcium sulfate dihydrate occurring in set plaster adhering to tools used in the manufacture of a previous plaster mix.

Sodium acid sulfate has been found to be an excellent addition material, together with a retarder, for stabilizing the time of set of calcined gypsum, that is to say, gypsum rock that has been heated to eliminate the major portion of the water of crystallization leaving a material which is approximately calcium sulfate hemihydrate as a residue. Upon the addition of water to the calcined gypsum, solution of the hemihydrate occurs which latter then reacts with water to form the less soluble dihydrate, thus producing an interlocking crystalline mass of set calcium sulfate dihydrate.

Set stabilized plasters, as heretofore produced from niter cake or sodium acid sulfate, have been found to produce a product of uneven properties and of spotty setting time. In studying the action of sodium acid sulfate in this connection, it has been found that this material deliquesces to a considerable degree in air and due to this property absorbs considerable water and tends to ball up or lump during its admixture with the stucco, which operation is performed in any conventional type of mixer. There is thus produced in the plaster mix a preponderance of sodium acid sulfate in isolated portions throughout the mix and as the sodium acid sulfate is in itself a strong accelerating agent tending to produce calcium sulfate dihydrate with considerable rapidity, non-uniform setting in isolated spots has heretofore been encountered when employing sodium acid sulfate and retarder as a set stabilizing composition for calcined gypsum.

It is an object of the present invention to prepare gypsum plaster having a relatively constant time of set irrespective of the conditions of its use by the employment of sodium acid sulfate and a retarder.

It is also an object of the invention to employ sodium acid sulfate and a retarder as the set stabilizing composition with the production of a plaster having a stabilized time of set and in which the isolated areas of accelerated set are eliminated.

In accordance with the present invention sodium acid sulfate, as the same is encountered on the market under the designation niter cake, is first prepared in a mix where it is substantially non-lumping when in air, and to this end the niter cake is ground and mixed with sufficient calcium sulfate hemihydrate to prevent absorption of so much water by the niter cake that the latter will deliquesce. The grinding or mixing may be performed in any conventional form of grinding or mixing apparatus, such as a ball mill, paddle type mixer, and the like, as, for instance, a Broughton mixer, and may be performed at room temperature or at temperatures above room temperature. During the grinding or mixing operation, the mix of niter cake and calcined gypsum is reduced to an intimate powdered admixture that is dry and possesses no tendency to ball or lump up. Such mixture of niter cake and calcined gypsum can therefore be stored and subsequently added to and mixed with additional quantities of calcined gypsum without lumping or balling up whereby a uniform plaster product is obtained having a uniform time of set throughout its volume.

The quantity of calcined gypsum to be admixed with the niter cake in order to obtain a non-lumping mix depends somewhat upon the original condition of moisture in the niter cake. If the latter be very moist, somewhat larger quantities of calcined gypsum are required than is necessary for admixture with niter cake that is relatively dry. In general, it will be found that about 10% to 200% or more of calcined gypsum is necessary for admixture with the niter cake in order to produce a composition in which the niter cake alone does not deliquesce upon standing and which may be stored and used as desired as an addition agent to calcined gypsum in preparing a set stabilized plaster without lumping and consequent segregation of niter cake.

As an example, purely illustrative of the invention but not limitative thereof, 500 pounds of niter cake were ground and mixed in a paddle type mixer with 500 pounds of calcined gypsum containing approximately 5.3% water crystallization. The grinding was performed at room temperature for 15 minutes and the niter cake of the mixed and ground product showed no tendency to deliquesce upon standing in the air so as to lump and ball up upon subsequent mixing with a large excess of calcined gypsum. Set stabilized gypsum plaster was made from this mix and calcined gypsum by adding to each 2,000 pounds of calcined gypsum, 15 pounds of the mixed niter cake and 9 pounds of a commercial retarder comprising nitrogenous material let down with lime.

The resultant material was stabilized as to time of set since water mixes made with clean apparatus and distilled water and permitted to set in a dust-free environment, set and hardened in the same time as mixes made under job conditions and containing varying proportions of sand.

It will be understood that the quantity of retarder required to be added to the set stabilized plaster may be ground in with the niter cake and stucco in the preparation of the non-lumping mix of the latter or may be added separately with the niter cake-calcined gypsum composition in the manufacture of the set stabilized plaster. Although commercial retarder has been illustrated as the addition agent in the manufacture of the set stabilized plaster, other retarding materials, such as glue, may also be added, providing only that there be sufficient quantity of some retarder with the sodium acid sulfate so that addition of the combined ingredients to the extent of about 0.5 to 2.0%, based on the weight of the calcined gypsum to be stabilized, may be added to the retarder to produce a set stabilizing effect. The ultimate set stabilized plaster should contain from about 1 pound to 15 pounds per ton of sodium acid sulfate and about 4 pounds to 14 pounds per ton of retarder.

What is claimed is:

A non-lumping, non-balling mix suitable for admixture with calcined gypsum without segregation therein comprising niter cake and about 10% to 200% of calcined gypsum based upon the weight of the niter cake.

DEAN D. CRANDELL.